United States Patent [19]

Gabriel et al.

[11] Patent Number: 4,753,257

[45] Date of Patent: Jun. 28, 1988

[54] ARRANGEMENT FOR CLEANING OF COMPONENTS BY A CLOSE ULTRASONIC FIELD, PARTICULARLY FOR CLEANING OF CYLINDRICAL FILTER INSERTS

[75] Inventors: Karel Gabriel, Plzen; Frantisek Smolik, Strasice III; Eduard Steif, Plzen; Vaclav Sabek, Vejprnice, all of Czechoslovakia

[73] Assignee: SKODA Koncernovy podnik, Plzen, Czechoslovakia

[21] Appl. No.: 912,040

[22] Filed: Sep. 26, 1986

[30] Foreign Application Priority Data

Sep. 26, 1985 [CS] Czechoslovakia .................. 6896-85

[51] Int. Cl.⁴ .............................................. B08B 3/10
[52] U.S. Cl. ................................ 134/184; 134/166 R; 210/384
[58] Field of Search ...................... 134/1, 184, 166 R; 68/355; 210/384, 388, 391

[56] References Cited

U.S. PATENT DOCUMENTS

| | | |
|---|---|---|
| 452,077 | 4/1986 | Gabriel et al. |
| 2,828,231 | 3/1958 | Henry ........................ 134/1 |
| 2,941,908 | 6/1960 | Logan ........................ 134/1 |
| 2,974,070 | 3/1961 | Van Dungeren ........................ 134/1 |
| 3,234,047 | 2/1966 | Olson ........................ 134/1 X |
| 3,413,988 | 12/1968 | Butler ........................ 134/166 R X |
| 3,638,666 | 2/1972 | Fishman ........................ 134/184 X |
| 3,855,131 | 12/1974 | Thumberger ........................ 210/391 X |
| 3,957,650 | 5/1976 | Petrushkin et al. ........................ 210/391 X |
| 4,526,688 | 7/1985 | Schmidt, Jr. et al. ........................ 210/388 X |

Primary Examiner—Harvey C. Hornsby
Assistant Examiner—Frankie L. Stinson
Attorney, Agent, or Firm—Klein and Vibber

[57] ABSTRACT

An arrangement for cleaning components by a close ultrasonic field, particularly for cleaning of cylindrical filter inserts provides a strong ultrasonic field in a relatively small space enabling the cleaning of contaminations sticking to the filters. Means are provided for eliminating the influence of a varying strength of the ultrasonic field at different parts of an ultrasonic tool.

10 Claims, 1 Drawing Sheet

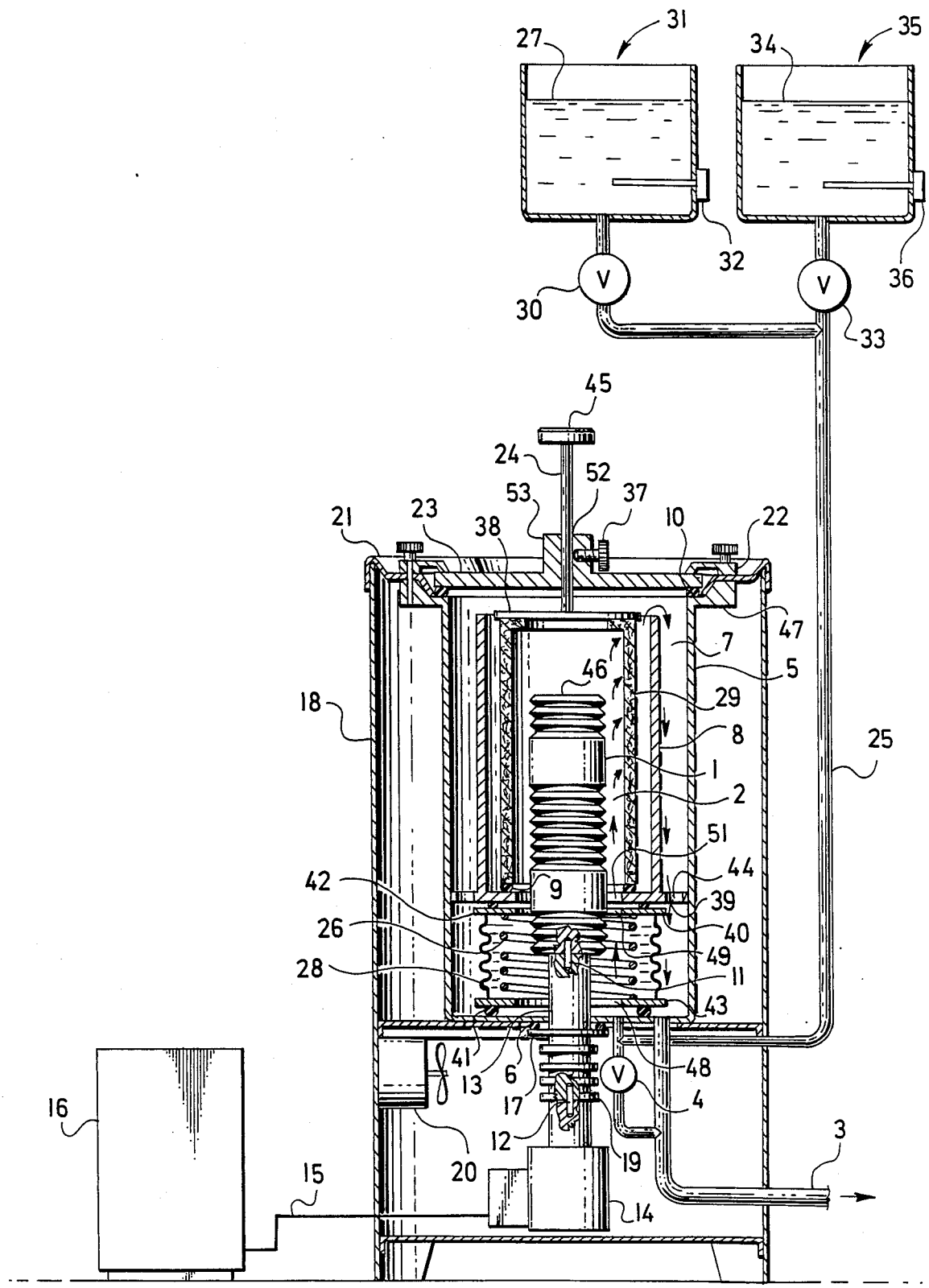

ARRANGEMENT FOR CLEANING OF COMPONENTS BY A CLOSE ULTRASONIC FIELD, PARTICULARLY FOR CLEANING OF CYLINDRICAL FILTER INSERTS

This application is related to our co-assigned issued U.S. Pat. No. 4,582,077.

BACKGROUND OF THE INVENTION

The invention relates to an arrangement for cleaning components by a close ultrasonic field, particularly for cleaning of cylindrical filter inserts. The arrangement comprises an ultrasonic cleaning tool with transverse recesses, connected by way of a tuned transmission line with an ultrasonic transducer which is electrically conductively connected with a high frequency generator. The arrangement further comprises a case, a cleaning vessel, containers for a cleaning and rinsing liquid and the necessary fittings.

Known ultrasonic cleaning devices comprise generally at least one tub of larger volume containing a liquid cleaning medium, ultrasonic emitters and a high frequency generator. These arrangements do not secure a perfect cleaning of components with contaminations sticking to them with medium tenacity. Moreover, the known arrangements are not very energy efficient. The intensity of the ultrasonic field amounts to usually 0.5 to $2 \times 10^4$ W/m². A more advantageous arrangement is for example described in the DBR-DOS No. 2,624.369 where, due to a constructional disposition, ultrasonic power is emitted in a concentrated fashion from active acoustic transducers into a liquid. A drawback of this arrangement, however, is that an oscillating element with a number of surfaces contained in a housing operates in an open tub with liquid and the acoustic transducer used cannot operate at higher temperatures of the liquid cleaning medium then 90° C. An additional drawback of this arrangement is that it lacks a supply of clean liquid medium into the space of the cleaned component, and this is required in order to achieve a perfect and quick cleaning.

SUMMARY OF THE INVENTION

It is an object of this invention to eliminate or at least to reduce the mentioned drawbacks of the prior art and to provide an arrangement for ultrasonic cleaning of components, particularly of cylindrical filter inserts, more effectively. According to the invention, in a cleaning vessel with a discharge conduit, a second flange with a central opening is arranged above the bottom of said cleaning vessel, distanced from a first flange with a central opening by a spring encompassed by a sleeve of bellow shape. A flange with a central opening and with circumferential openings of an overflow element with an overflow partition wall of pot shape is situated above the first flange whereby a fifth packing is provided between the bottom of the cleaning vessel and the second flange. A fourth packing is provided between the first flange and the flange of the overflow element. The ultrasonic cleaning tool with a tuned transmission line is situated in central openings of the first and second flange and of the flange with the overflow element. The cleaning vessel is provided in its upper part with a forth flange fixed to a working desk. A third packing is provided between said working desk and a cover. The cover is secured in its position by clamps fixed on the working desk and is provided with a flange with a central opening in which a guiding rod is slidingly situated, its position being secured by a set screw in the flange of the cover. A push button is fixed on said rod beyond the cleaning vessel and a thrust plate is on its other end within the cleaning vessel.

The advantage of the arrangement according to this invention is that it enables the cleaning of components with contaminations which stick to them with a medium tenacity. The intensity of ultrasonic field obtained in the cleaning space amounts to about $20 \times 10^4$ W/m² and is predominantly dependent on the working amplitude of the deviation of oscillations of the ultrasonic tool with transverse recesses. The arrangement can operate at temperatures of the liquid medium higher than 90° C. The ultrasonic power is emitted in the close neighborhood of the cleaned component to a relatively small volume of the liquid cleaning medium. Thus in case of the same intensity of the ultrasonic field, to which the component is exposed, a substantial part of the ultrasonic power required for cleaning in classical ultrasonic cleaning devices with a tub of large volume filled with liquid medium is saved.

BRIEF DESCRIPTION OF THE DRAWING

With these and other objects in view, which will become apparent in the following detailed description, the present invention, which is shown by example only, will be clearly understood in connection with the accompanying drawing, in which:

The single FIGURE is a vertical sectional view diagrammatically illustrating an exemplary embodiment of the present invention.

DETAILED DESCRIPTION OF THE DRAWINGS

The arrangement as shown in the drawing comprises an ultrasonic cleaning tool 1 with lateral recesses 46 of "V" shape with an internal angle of 90° and a depth of [lambda]/50 situated at zones of the maximum aplitude of longitudinal oscillations. The ultrasonic tool 1 has an acoustic length of two half wave lengths (2×[lambda]/2) and is situated in central openings 48, 49, 51 of the first and second flange 43, 42 and of the flange of an overflow element with an overflow partition wall 8. It is connected by a first screw connection 11 with a tuned transmission line 13 which is by its flange 17 connected and packed by a first packing 6 to the external surface of the bottom of a cleaning vessel 5. The tuned transmission line 13 is provided with cooling ribs 19 cooled by a fan 20. The tuned transmission line is connected by a second screw connection 12 with an ultrasonic transducer 14 which is connected by a cable 15 electrically conductively with a high frequency generator 16.

The cleaning vessel 5 is provided on the external side of its bottom with a supply conduit 25 and is connected by means of a first valve 4 with a discharge conduit 3. The supply conduit 25 is connected both over a second valve 30 to a container 31 of a liquid cleaning medium 27 and by way of a third valve 33 to a container 35 of a rinsing medium 34. Both containers 31, 35 are provided with heating elements 32, 36. In the space above the bottom of the cleaning vessel 5, between a second flange 43 with the central opening 48, where between said flange 43 and the bottom of the cleaning vessel 5 a fifth packing 41 is provided, and the first flange 42, a spring 26 is arranged which is encompassed by a sleeve 28 of bellow shape. A fourth packing 40 is provided between the first flange 42 and the flange 39 of the overflow element with the overflow partition wall 8 of pot shape, in which flange 39 a central opening 51 and circumferential openings 44 are provided.

The cleaning vessel 5 is provided in its upper part with a fourth flange 47 fixed to a working desk 21, wherebetween said flange 47 and a cover 23 a third packing 10 is arranged. The position of the cover 23 is secured by clamps 22 fixed to the working desk 21. The cover 23 is provided with a flange 53 with a central opening 52, in which a guiding rod 24 is situated in sliding fashion, the position of which is secured by a set screw 37 and which is provided beyond the cleaning vessel 5 with a pushbutton 45 and within the cleaning vessel 5 with a thrust plate 38. An overflow space 7 is created between the partition wall 8 of the overflow element and the cleaning vessel 5. A second packing 9 on which the cleaned filter insert 29 rests is provided on the overflow element with the partition wall 8.

A cleaning space 2 is created between the cleaned filter insert 29 and the ultrasonic cleaning tool 1. The cleaning vessel 5, the fan 20, the ultrasonic transducer 14 with the tuned transmission line 13 are situated in a case 18.

The arrangement for cleaning of components by a close ultrasonic field operates as follows:

The first valve 4 between the supply conduit 25 and the discharge conduit 3 is closed. After opening of clamps 22, the cover 23 is lifted and, by opening the second valve 30, a liquid cleaning medium 27 (preheated by heating element 32) is supplied up to about half of the cleaning space 2 with the ultrasonic cleaning tool 1.

The second valve 30 is thereafter closed and the contaminated filter insert 29 is introduced into the cleaning space 2 which filter insert 29 bears on the second packing 9 of the flange 39. The cover 23 is again placed on fourth flange 47 of the cleaning vessel 5 and is secured by clamps 22. After release of the set screw 37 on the cover 23, the thrust plate 38 is, by action of the push button 45 by a gentle pressure, pressed on the filter insert 29 and is secured in its position by the set screw 37.

The second valve 30 is thereafter opened and the liquid cleaning medium 27 starts to enter the interior space of the filter insert 29. The high frequency generator 16 is started and feeds by way of a transmission cable 15, the ultrasonic transducer 14 which excites by way of the tuned transmission line 13, the ultrasonic cleaning tool 1.

Ultrasonic power of high intensity is created by the ultrasonic field which is emitted by the ultrasonic tool 1 predominantly from surfaces of recesses 46 perpendicular to the surface of the cleaned filter insert 29 (or similar component). In the course of cleaning, a constant limited supply of clean liquid cleaning medium 27 passes into the internal space of the filter insert 29 and passes through the porous wall of the filter insert 29 to be discharged over the partition wall 8 of the overflow element into the overflow space 7 and over openings 44 into the discharge conduit 3. This enables a perfect and quick cleaning of components particularly of filter inserts 29 even with contaminations sticking thereto with medium tenacity.

As the acoustic power emitted by the ultrasonic cleaning tool 1 is not equal along its whole longitudinal surface, it is a maximum at the zone of oscillation peaks, it is necessary to shift the cleaned filter insert 29 after a certain time of cleaning for about a half of a half wave length [lambda]/2 of the ultrasonic cleaning tool 1, i.e. for lambda/4 closer to the bottom of the cleaning vessel 5. This is achieved by loosening the set screw 37 and by gentle pressure on the push button 45. Thus the filter insert 29 is shifted for the mentioned length to a new position, which position is again secured by the set screw 37 and the cleaning process proceeds for the same time, the overall cleaning time being about 3 to 5 minutes.

After the filter insert 29 is cleaned, the second valve 30 is closed and it is possible to perform in the same way a short rinsing by a rinsing medium 34 after opening the third valve 33. The third valve 33 is closed after the rinsing has been performed. The set screw 37 and the clamped clamps 22 are released, the cover 23 is lifted and the cleaned filter insert 29 is removed from the cleaning space 2. Another following cleaning is performed in the same way, however, without the prior partly filling of the cleaning space 2 by a liquid cleaning medium 27.

After all cleaning is finished, the liquid cleaning medium 27 is discharged from the cleaning space 2 over the first valve 4 into the discharge conduit 3.

Although the invention is described and illustrated with reference to a preferred embodiment thereof, it is to be expressly understood that it is in no way limited to the disclosure of such preferred embodiment but is capable of numerous modifications within the scope of the appended claims.

We claim:

1. A device for cleaning of components by a close ultrasonic field, particularly for cleaning of cylindrical filter inserts comprising a case containing a cleaning vessel with a cover, an overflow element within said cleaning vessel encompassing a filter insert to be cleaned, an ultrasonic cleaning tool with transverse recesses of an acoustic length of at least one half wave length, said cleaning tool being connected by a tuned transmission line to an ultrasonic transducer connected electrically with a high frequency generator, and spring means for supporting the filter insert to be cleaned, said spring means being supported at one end by a first flange with a central opening and encompassed by a sleeve of bellow shape, said spring means being supported at its other end by a second flange with a central opening resting on the bottom of the cleaning vessel.

2. A device as claimed in claim 1 wherein, said overflow element is provided at one end with a flange with a central opening and circumferential openings, which overflow element flange is supported by said first flange, said overflow element having an overflow partition wall of pot shape.

3. A device as claimed in claim 2 wherein the ultrasonic cleaning tool with the tuned transmission line is situated in the central openings of said first and second flange and of the flange of the overflow element.

4. A device as claimed in claim 2 wherein the overflow element together with the filter insert are simultaneously positionally adjustable relative to the ultrasonic cleaning tool.

5. A device as claimed in claim 1 wherein said cleaning vessel is connected at its top to a working desk and clamps secure said cover to the desk.

6. A device as claimed in claim 1 further comprising said cleaning vessel being connected by conduit means with valves to a supply of cleaning liquid and a supply of rinsing liquid.

7. A device as claimed in claim 1 further comprising a central opening at the center of the cover of the cleaning vessel.

8. A device as claimed in claim 7 further comprising a sliding rod passing through the central opening of said cover thereby having an external part above said cover and an internal part beneath said cover.

9. A device as claimed in claim 8 further comprising, said sliding rod being fixable by a set screw.

10. A device as claimed in claim 8 further comprising, said sliding rod being provided with a push button at its external part and a thrust plate at its internal part, whereby movement of said sliding rod through said opening biases said thrust plate against said filter insert, thereby biasing said filter insert against said spring means and permits movement of said filter insert relative to said cleaning tool.

* * * * *